United States Patent [19]

Severson et al.

[11] 4,085,730
[45] Apr. 25, 1978

[54] SOLAR AIR HEATER

[75] Inventors: Asbjorn M. Severson, Minneapolis; Richard L. Sampson, Excelsior, both of Minn.

[73] Assignee: Honeywell Inc., Minneapolis, Minn.

[21] Appl. No.: 740,640

[22] Filed: Nov. 10, 1976

[51] Int. Cl.² ............................................. F24J 3/02
[52] U.S. Cl. ................................................. 126/270
[58] Field of Search ............... 126/270, 271; 237/1 A; 165/109, 181, 182

[56] References Cited

U.S. PATENT DOCUMENTS

| 2,680,437 | 6/1954 | Miller | 126/270 |
| 3,875,925 | 4/1975 | Johnston | 126/270 |
| 3,939,818 | 2/1976 | Hamilton et al. | 126/270 |

FOREIGN PATENT DOCUMENTS

| 1,234,792 | 10/1960 | France | 126/271 |

Primary Examiner—Kenneth W. Sprague
Assistant Examiner—James C. Yeung
Attorney, Agent, or Firm—Charles G. Mersereau; Henry L. Hanson

[57] ABSTRACT

A low-cost solar air heater is disclosed which utilizes an array of jets to produce impingement of the air on the lower surface of the absorber plate which enhances heat transfer efficiency.

11 Claims, 5 Drawing Figures

SOLAR AIR HEATER

CROSS-REFERENCE TO RELATED APPLICATION

Reference is made to a co-pending application by Roger N. Schmidt, Ser. No. 740,639 filed of even date, and assigned to the same assignee. That application is also concerned with a solar air heater.

By that invention a plurality of holes or air jets are arranged to cause the unheated air to impinge on the upper surface of the absorber panel. There is no plenum beneath the absorber plate. By the present invention, an array of jets is utilized to produce impingement of unheated air on the lower surface of the absorber plate. Thus, intake air is supplied to a plenum chamber beneath the absorber plate from which it is supplied through the jets to impinge on the lower surface of the absorber plate.

BACKGROUND OF THE INVENTION

1. Field of the Invention

The present invention relates generally to the field concerned with the utilization of solar energy for heating and cooling and, more particularly, to an improved solar air heater.

2. Description of the Prior Art

Because the rapid depletion of conventional sources of energy is resulting in an ever-worsening energy crunch, the use of solar energy is becoming increasingly important as an alternative to such sources as petroleum. This is especially true in the field of heating and cooling and in electric power generation.

Solar collectors which use solar energy to heat a black body absorber plate which, in turn, is used in the heating mode to transfer absorbed energy to a fluid heating medium are becoming an important source of at least part of the heat requirement for homes and other buildings. The prior art is replete with numerous attempts to utilize solar collector panels to heat a variety of fluid media by contacting such media with a solar absorber member. The typical solar collector heat transfer media includes water as a liquid medium and air as a gaseous medium.

The use of solar energy heat transfer systems employing liquid fluids such as water rather than gaseous fluids such as air does enjoy two principal advantages. The higher heat transfer coefficients of the liquid media results in lower temperature differences between the liquid and the absorber panel. Also, because liquids have a much higher heat capacity and smaller volume per unit mass, a physically smaller ducting system from the collector to the storage tank or heating system will suffice.

The above advantages, however, are in many cases far outweighed by the major disadvantages from which a liquid system suffers. Liquid systems are subject to leakage and therefore all elements of this system including the absorber panel, all connecting piping and heat storage area must be of leakproof construction. Also, because many of these systems are basically water-based systems, anti-freeze such as ethylene glycol or the like must be added to the liquid medium to prevent freezing. In addition to the leakproof nature of the entire system, the system must be made of a material which is not subject to corrosion by the liquid heat transfer medium. All these are concerns which are real and expensive or difficult to combat in a liquid system yet are unimportant to an air system. With an air system some leakage can be tolerated and phase changes and corrosion do not present problems. The net result is that the liquid system becomes far more expensive than a typical air system because of the above-mentioned disadvantages.

Insofar as an air system itself is concerned, there are several heat transfer configurations which may be considered. Many prior art systems utilize what is essentially a parallel flow wherein the intake air which is being heated is caused to flow parallel to the surface of the absorber plate as the heat transfer therebetween takes place. An example of the use of air as the heat transfer medium in such a system is found in U.S. Pat. 2,998,005 issued to J. G. Johnson dated Aug. 29, 1961. That patent illustrates and describes, inter alia, a solar collector which may use air as the heat transfer medium. While this and similar configurations are easily constructed and inexpensive, the configuration produces a slow moving laminar boundary layer adjacent the heat transfer surface which detracts from the efficiency of the heat transfer because of the slow moving boundary layer. In order to enhance heat transfer, the channel must be narrowed resulting in a higher pressure drop within the system which, of course, necessitates the use of a higher horsepower air circulation system and lowered overall efficiency.

Another alternative system makes use of finned plates to enhance the heat transfer between the absorber plate and the air by increasing the area of contact therebetween. This arrangement seems to work effectively both from the heat transfer and pressure loss standpoints, however, the finned plate construction is relatively expensive in comparison to flat parallel plate construction.

SUMMARY OF THE INVENTION

According to the present invention there is provided a solar collector air heater which exhibits a high heat transfer efficiency while accomplishing a reduction in system pressure losses and which is relatively inexpensive to construct. The solar collector of the present invention includes an array of air jets which cause the unheated inlet air to impinge on the reverse side of the solar absorber plate thereby breaking up the laminar boundary layer which exists at the interface between the air and the absorber plate in conventional laminar flow systems and increasing the heat transfer efficiency of the system. The preferred embodiment includes a double-glazed window for the admission of the sun's rays, a thin metallic absorber plate spaced beneath the double-glazed unit, an array of holes or jet nozzles spaced beneath the absorber plate such that air flowing through the nozzles is caused to impinge against the lower surface of the absorber plate, air inlet and outlet passages either of which may be attached to a means for moving the air such as a conventional make-up air blower used in conjunction with the heating and cooling systems of most buildings. The spacing between the nozzles and the absorber plate may be made adjustable such that efficiency may be maximized. The jet nozzles may be mounted in a plate which is flat, corrugated or channeled or of any other desirable shape. The size and spacing of the nozzles may be varied as required. A plurality of such collector panels can be manifolded together and used in conjunction with a single blower.

BRIEF DESCRIPTION OF THE DRAWINGS

In the drawings wherein like numerals are utilized to designate like parts throughout the same:

FIG. 3b is an end elevational view of the nozzle system of FIG. 3a; and

DESCRIPTION OF THE PREFERRED EMBODIMENT

Figure 1:
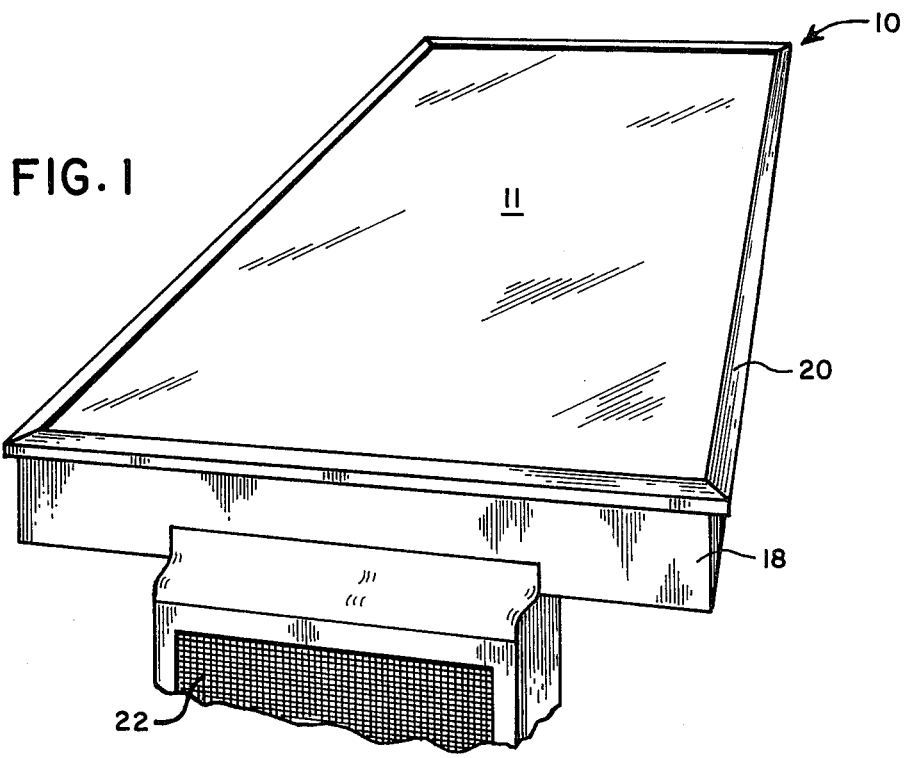
FIG. 1 is a prospective view of a typical assembled solar air heater panel using the invention.
Figure 2:
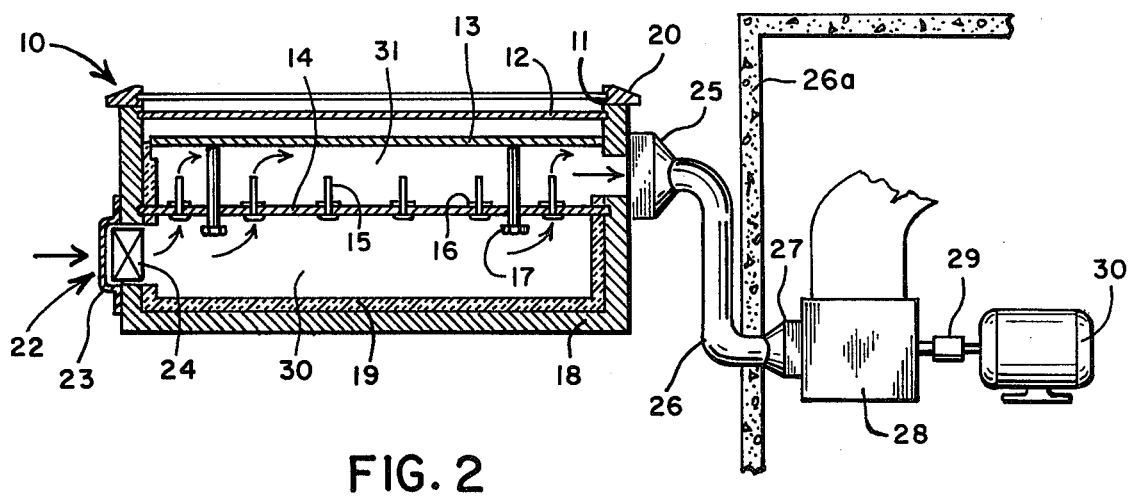
FIG. 2 is a side view, partially in section, of a typical solar air heater as shown in FIG. 1, and associated system.

In the drawings, FIG. 1 represents a perspective view of a typical assembled solar collector panel 10, the components of which can best be described in conjunction with the sectional view of FIG. 2. The collector panel includes spaced, parallel solar energy admitting windows 11 and 12. These may be made of glass or a suitable transparent plastic material and are normally treated such that the reflection from the upper surfaces thereof is minimized as by painting with an anti-reflection coating or by etching. Spaced beneath the windows 11 and 12 is the solar absorber plate 13 which may be made of metal or other suitable heat-conducting material. The absorber plate is normally coated to produce a highly absorptive black body surface. Mounted in spaced relation beneath the absorber plate is an additional plate 14 which supports an array of hollow nozzles as at 15, which may be in the shape of ferrules retained as by snap-on nuts 16. The separation between the absorber plate 13 and the nozzle retaining plate 14 may be controlled by spacer screws 17.

The assembly is contained in a box-like structure 18 which may be made of wood or metal or other suitable retaining material. The unexposed surfaces are insulated as at 19 to minimize heat losses from the system. Also a top coping frame may be provided as at 20.

Figure 3A:
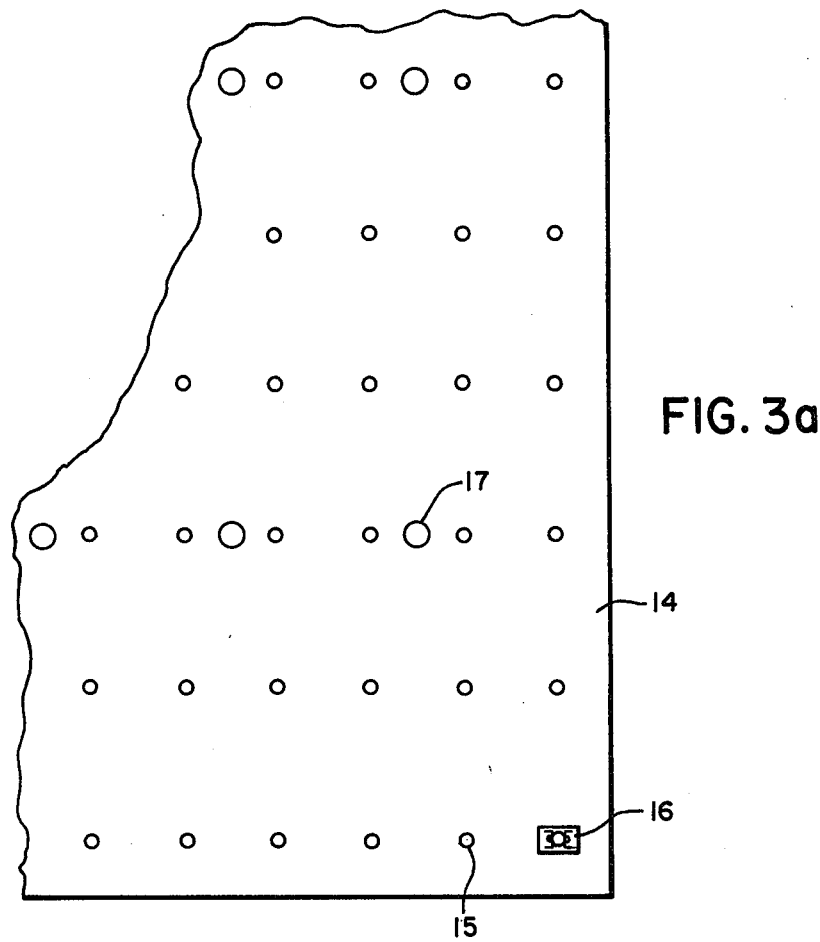
FIG. 3a is an enlarged, fractional top view of the nozzle array of the invention.
Figure 3B:
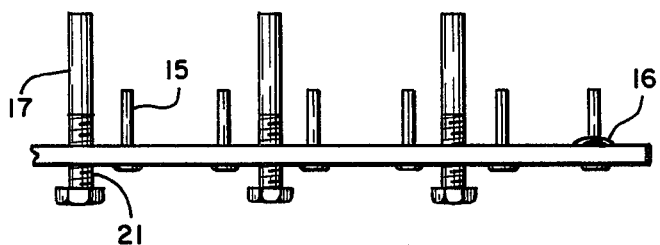

As better seen in FIGS. 3a and 3b, the nozzles 15 are normally spaced in a regular pattern throughout the area of the retaining plate 14. The spacer screws 17 may be threaded through the plate as at 21 to provide the proper required height adjustment to control the space between the nozzle support plate 14 and the solar absorber plate 13.

The solar absorber panel 10 is provided with an inlet filter as at 22 which may be comprised of a bird screen element 23 and an internal filter 24 or other type filter system as required by the particular application of the system. The inlet, of course, can also be part of a recirculation system and be provided with air from a closed system. The outlet, which may be in the form of a slot extending across the panel 10 feeds into a collector duct 25 which is shown connected by a duct 26 to the inlet 27 of a conventional blower as at 28. The blower is coupled as at 29 to a conventional drive motor 30. Of course, the blower duct work may be insulated as required to reduce system heat losses.

The operation of the illustrative embodiment is basically in the nature of a pull-through system connected to the suction side of the blower 28. Thus, air is sucked in through the intake filter unit 22 and is caused to travel through the nozzles 15 impinging upon the back side of the absorber plate 13 and traveling therealong where it is collected at the outlet 25 traveling at thence to the suction side of the blower 28.

It will be appreciated that the size and spacing of the nozzles 15 in conjunction with the size of the bottom plenum 30 formed between the nozzle retaining plate and the bottom of the collector along with the size of the plenum 31 formed between the absorber plate and the top of the nozzle retaining plate 14 are such that the flow through the nozzles 15 is essentially uniform throughout the area of the absorber panel such that impingement of the air flowing through the nozzles on the lower surface of the absorber plate is essentially uniform producing essentially uniform heat transfer throughout the unit.

Successful embodiments have been produced utilizing aluminum ferrule-type nozzles or jets provided in a square pattern on centers from 1 inches to 4 inches apart and having a nozzle I.D. of from 0.2 to 0.4 inches.

Another successful method (not shown) of accomplishing substantially uniform flow through the air distribution plate 14 involves inserting an additional plate beneath the plate 14 which is disposed at an acute angle therewith such that the inlet air encounters an ever-decreasing cross-section in the bottom plenum 30.

The use of an array of jets in the manner of the present invention offers all the advantages of a high heat transfer rate between the air and the absorber plate, low pressure drop and low cost construction. By pulling or forcing the air through the array of jets 15 so that it impinges on the lower surface of the absorber plate, a relatively high average heat transfer coefficient is achieved over the entire plate and the use of impinging air also breaks up the laminar boundary layer associated with parallel plate flow. Successful embodiments have utilized a nozzle velocity of 20 — 20 feet per second on an air volume of approximately 2 to 5 SCFM per square foot of absorber. The construction, while somewhat more expensive than the simple provision of two parallel plates, is a great deal less expensive than either the finned plate construction or any of these involving liquid fluid heat transfer media.

Figure 4:
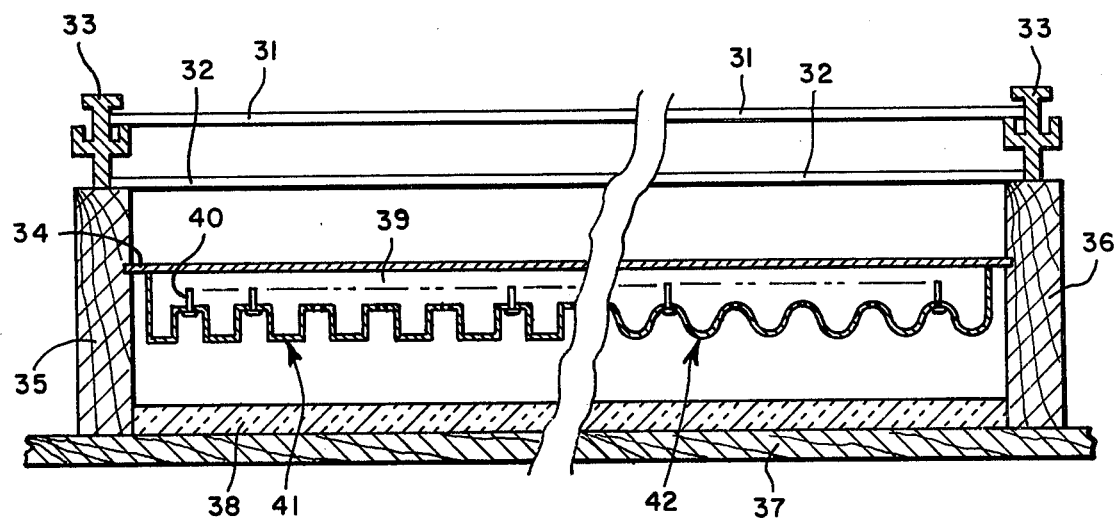
FIG. 4 is a broken sectional end view of the collector depicting alternative nozzle mountings.

In addition to the utilization of an array of air jets spaced on a flat plate such as that shown in FIG. 2, other configurations which produce excellent results can be used. FIG. 4 depicts two such embodiments. Those particular embodiments are shown as though they were built into a section of roof. Thus, in FIG. 4 we see, in broken section, an end view of parts of two additional solar collector assemblies, including transparent windows 31 and 32 carried by supports 33 and an absorber plate 34 carried as between typical wood roof trusses or joists which are represented by 35 and 36. The panels are carried between the roof trusses above the bottom sheeting shown at 37 with insulation as at 38.

Carried at a pre-determined spacing 39 from the lower surface of the absorber plate 34 again are a series of nozzles 40 which may be similar to those described above. The nozzle support member 41 shown as in the left portion of the broken figure is in the form of a channeled member having channels parallel to the general flow of the air from inlet to outlet of the solar collector. The nozzle support section 42 to the right of the broken line in the figure utilizes a corrugated configuration in the same manner.

These two additional embodiment configurations enable close placement of the nozzles to the undersurface of the solar absorber plate 34 and at the same time additional plenum space to reduce the total pressure loss as the air traverses the entire collector assembly.

As shown in FIG. 2, the blower and duct assembly may be internal to the building as by traversing a wall 26a and such a system as that generally shown as the preferred embodiment may be used as to pre-heat make-up air circulated through a commercial or industrial building to greatly increase the heating efficiency. Thus, if make-up air can be admitted to a building during the cool months at a temperature above that of the ambient outdoor temperature, much of the heat input required to maintain the temperature inside the building may be eliminated.

The embodiments of the invention in which an exclusive property or right is claimed are defined as follows:

1. A solar air heater comprising:
   at least one window member in substantially sheet form transparent to solar energy and impervious to air for admitting solar energy to said air heater;
   an absorber member in substantially sheet form beyond said window in spaced relation, thereto said absorber member being highly absorbent to solar energy, heat conductive, impervious to air and disposed to directly receive the solar energy transmitted by said window member;
   an air distribution member in substantially sheet form beyond said absorber member and disposed in spaced relation thereto said distribution member having a plurality of openings therein said plurality of openings being of a predetermined size and pattern such that air flowing therethrough toward said absorber member impinges on said absorber member;
   closure means adapted to receive said window, absorber and air distribution members in spaced relation forming chambers therebetween, said closure means having a lower surface forming a chamber with said air distribution member;
   means for admitting unheated air to said chamber formed between said air distribution member and said lower surface; and
   means for exhausting heated air from said chamber formed between said absorber and air distribution members.

2. The solar air heater of claim 1 further comprising a pair of window members disposed in substantially spaced parallel relation.

3. The solar air heater of claim 1 further comprising means for adjusting the relative relation between said absorber and said air distribution member.

4. The solar air heater of claim 1 wherein said predetermined size and pattern of said openings are such that air flowing from said chamber formed between said air distribution member and said lower surface to said chamber formed between said absorber and air distribution member impinges on said absorber substantially uniform manner and substantially at right angles angles thereof.

5. The solar air heater of claim 4 wherein said air distribution member is a perforated member.

6. The solar air heater of claim 1 further comprising a plurality of nozzles disposed in the openings in said air distribution member.

7. The solar air heater of claim 6 wherein said predetermined size and pattern of said nozzles are such that air flowing from said chamber formed between said air distribution member and said lower surface to said chamber formed between said absorber and air distribution member impinges on said absorber in a substantially uniform manner and substantially at right angles thereto.

8. The solar air heater of claim 1 wherein said means for admitting air and said means for exhausting heated air are located at opposite ends of said air distribution member.

9. The solar air heater of claim 1 wherein said air distribution member is in the form of a corrugated sheet.

10. The solar air heater of claim 1 wherein said air distribution member is in the form of a channeled sheet.

11. The solar air heater of claim 1 wherein said air distribution member is disposed in a substantially parallel relation to said absorber member.

* * * * *

UNITED STATES PATENT OFFICE
CERTIFICATE OF CORRECTION

PATENT NO. : 4,085,730

DATED : April 25, 1978

INVENTOR(S) : Asbjorn M. Severson and Richard L. Sampson

It is certified that error appears in the above—identified patent and that said Letters Patent are hereby corrected as shown below:

Column 6, line 16, cancel "angles" the second time it appears.

Column 6, line 17, cancel "thereof" and substitute therefor --thereto--.

Signed and Sealed this

Third Day of October 1978

[SEAL]

Attest:

RUTH C. MASON
Attesting Officer

DONALD W. BANNER
Commissioner of Patents and Trademarks